(12) United States Patent
Olesen

(10) Patent No.: US 8,277,682 B2
(45) Date of Patent: Oct. 2, 2012

(54) INORGANIC, STATIC ELECTRIC BINDER COMPOSITION, USE THEREOF AND METHOD FOR THE PREPARATION OF SAID BINDER COMPOSITION

(75) Inventor: Kristian P. Olesen, Vassoy (NO)

(73) Assignee: Desert Control Institute Inc., Mahé (SC)

( * ) Notice: Subject to any disclaimer, the term of this patent is extended or adjusted under 35 U.S.C. 154(b) by 710 days.

(21) Appl. No.: 12/160,670

(22) PCT Filed: Jan. 12, 2007

(86) PCT No.: PCT/NO2007/000012
§ 371 (c)(1),
(2), (4) Date: Nov. 10, 2008

(87) PCT Pub. No.: WO2007/081219
PCT Pub. Date: Jul. 19, 2007

(65) Prior Publication Data
US 2010/0135733 A1   Jun. 3, 2010

(30) Foreign Application Priority Data
Jan. 13, 2006   (NO) .................................. 20060203

(51) Int. Cl.
*C09K 3/22*   (2006.01)

(52) U.S. Cl. ...................................... 252/88.1; 252/88.2
(58) Field of Classification Search ................... 252/88.1
See application file for complete search history.

(56) References Cited

U.S. PATENT DOCUMENTS
5,085,707 A   2/1992   Bundy et al.

FOREIGN PATENT DOCUMENTS

| | | |
|---|---|---|
| CH | 479326 | 10/1969 |
| CN | 1536051 A | 10/2004 |
| GB | 1301005 A | 12/1972 |
| JP | 53011760 A | 2/1978 |
| RU | 2267514 C1 | 1/2006 |

OTHER PUBLICATIONS

Kirk-Othmer "Clays" Encyclopedia of Chemical Technology 3rd ed., vol. 6, pp. 190-192 and 216-223.

*Primary Examiner* — Necholus Ogden, Jr.
(74) *Attorney, Agent, or Firm* — Volpe and Koenig, P.C.

(57) ABSTRACT

An inorganic, static electric binder composition for use as a texture stabilizing element in masses of organic and/or inorganic particles and also as a filtering mass is presented. One major use of the binder composition is to reclaim arid and hyper-arid deserts and to prevent desertification and the movement and advancement of sand dunes, in other words stopping wind erosion efficiently. Also presented is a method for the preparation of the binder composition and the use thereof.

5 Claims, 3 Drawing Sheets

INORGANIC, STATIC ELECTRIC BINDER COMPOSITION, USE THEREOF AND METHOD FOR THE PREPARATION OF SAID BINDER COMPOSITION

The present invention relates to an inorganic binder composition which displays static electric charge, more precisely a homogenised dispersion of clay particle consisting substantially of single flakes of clay and air bubbles dispersed in a fluid. The present invention also relates to a method for the preparation of said binder composition as well as use of the binder composition as a texture stabilising element in an organic or inorganic particle composition, such as soil and sand. The invention also relates use of the binder composition as a filtering mass for the purification of, for instance, air or water.

The main causes of desertification are wind erosion and the advancement of sand dunes. It is known from land areas exposed to strong drought that the earth surface is easily exposed to wind erosion when a protecting, unifying vegetation cover is removed by overgrazing, traffic flow and so forth. The mineral soil particles, substantially consisting of sand, lack the ability to remain closely connected and sand transport may arise. This may also arise under relatively humid conditions, for example in sand dune formations, where the sand's reduced ability to transport humidity from the underground by capaillary action leads to local drying in the surface with subsequent lack of opportunity for vegetation with shallow root system to establish growth. Both the lacking ability of the mineral soil to maintain a stable unifying structure as well as the sand soils lacking ability to bind humidity from underground reservoirs are major obstacles with relation to for example maintenance and increase of food production ability in drought exposed areas.

It is generally recognized that when soil particles are entirely unattached to each other the soil is known as structureless or as a single grained structure such as the case of sand dunes. When, on the other hand, the primary soil particles under favourable circumstances tend to group themselves and associate into small units or aggregates, the soil is termed aggregated. It has been shown, in the studies of sandy soil, that about 99.5% of the original particles are of a diameter of less than 0.5 mm, i.e. constitute wind erodible particles. It is also evident that the percentage of dry aggregates >0.8 mm is less than 0.2% of the soil matrix.

It is also known that the formation and maintainance of stable aggregates is an essential feature which is highly desirable, due to the fact that it ensures the most favourable conditions for tilth, cultivation, plant growth and conservation of soil against degrading factors.

An organic binding agent is generally known which is intended for addition to the uppermost layer of mineral soil, in order to thereby stabilize the structure, increase the ability for capillary transport of water as well as increase the binding of water on the soil particles. The disadvantages of this binding agent is that the organic material is rapidly decomposed by the bacterial cultures living in the mineral soil in those parts of the world where this binding agent has its major use.

The dry mixing of clay into sandy soils have been researched and used up till 1987 when it was a fact that it was a much too expensive treatment even with just positive practical results.

Generally known is also the fact that clay has an extensive ability to bind water and to establish coherent structures in dry condition. Dry clay soil is hard to crumble, and dry clay forms hard, durable structures, used for instance in sun dried building blocks. Clay has already been used in an effort to combat desertification and to increase the fertility of the soil. Clay has a twofold function when applied to the soil. It enhances water retention, reduces the wash-out of fertilizers and rehabilitates the soil with regard to ion exchange. Secondly, it provides growing plants with nutrients. The previous use of clay for this purpose has been the use of dry clay for mixing with the soil. Substantial amounts of clay were required and the mixing required a considerable amount of mechanical work. The problems so far has thus been price and availability.

The object of the invention is to propose a new and improved solution to the problems outlined above whereby sandy deserts may be reclaimed and desertification may be prevented with higher efficiency, with less clay and less mechanical work and thereby at reduced costs.

The object is achieved by the features disclosed below in the specification and in the following claims.

It is generally known that flakes of clay, which are the mechanical single units in clay, are negatively electrically charged and has a strong ability to bind, inter alia, water to the surface thereof.

The invention substantially relates to a negatively charged binder composition consisting of homogenised, negatively charges flakes of clay for the binding of positively charged particles in order to increase the adsorption and the absorption capability of for instance water, impurities in water and undesirable substances in or on a target object when the binder composition is added to the target object. The binder composition may be added to the target object for instance in an aqueous solution. The positively charged particles may for instance be water molecules.

The clay particles may be provided in any form obtained by a homogenisation process which divides the clay into single flakes or particles consisting of a few coherent flakes of clay dispersed in a liquid, for instance water, whereafter the flakes of clay, after an application process, covers the surface of particles. The clay flakes have a surface diameter of from about 25 to 2000 nm, and a thickness from about 1 to 10 nm, adjusted to the particle structure of the target object. In order to increase the stability in the homogenised dispersion of clay flakes air may suitably be added in the form of microscopic bubbles which will give a weak cation bonding to the clay flakes. The result is that the mixture is stable until it comes into contact with cations of higher electrical charge/potential/valence. A single flake of clay in water will thus in reality consist of the solid particle and a cloud of air ions which neutralise the particle, surrounds it and is bonded by the charge of the solid particle.

The binder composition is applied, for instance on soil, by ordinary watering techniques in such an amount that the soil is moist down to the relevant root depth or to the depth required for stopping wind erosion.

The binder according to the invention has the desirable property that it hardens by drying and by heating combined with drying.

The application of the binder on soil particles result in an increased ability to attract and transport humidity with the aid of the clay particles humidity binding capacity, caused by the negative polarity, as well as the increased capillary transport ability, caused by the microscopic voids between the clay flakes. This increases the ability of plants to grow in the soil. This results in a better food access and increased absorption of carbon dioxide. The increased growth of plants also further the Albedo value of the soil, which means that the reflection of incident radiation is increased and that the temperature of the earth surface is reduced. (The Albedo or solar reflectance is a measure of a material's ability to reflect sunlight (including the visible, infrared and ultraviolet wavelengths) on a scale of 0 to 1. An Albedo value of 0.0 indicates that the surface absorbs all solar radiation and a 1.0 Albedo value represents total reflectivity.) Measurements have shown that in desert surroundings, with an air temperature of 32° C. and sea temperature of 28° C., the temperature measured over a sand surface was 51° C. which transformed to 34° C. over an area covered with grass. The ground surface temperature reduction achieved by greening was thus in the range of 17° C.

The dehydration makes the treated surface of the soil hard, which means that the surface to a greater extent will endure the load of traffic, wind and so forth without loosening of single particles, which causes the structure to collapse, the roots of plants to be destroyed and the soil, for example humus particles and other nutrient particles, to be carried away by the wind.

With the supply of water in the form of rainfall, irrigation or a change in the balance between evaporation and capillary transport of humidity from the underground, the soil is structure again softens.

In one embodiment of the present invention the binder composition may be mixed with a plant nutrient dissolved, or dispersed, in liquid before application on the soil, in order to increase the growth of plants.

The binder composition according to the invention may be applied by homogenising the mixture in water and thereafter applying this on the soil to be treated.

The soil particles may for instance be sand particles, humus particles, coarse plant remains, carbon particles and so forth, which in mixture or each on its own constitute a substantial part of the soil and which preferably should be bonded together so that no movement is taking place under normal stress levels applied on said particles.

In a first embodiment the invention relates to a binder composition for use as a structure stabilizing element in masses of organic and/or inorganic particles, comprising a homogenised mixture of clay, whereby the clay particles principally are separated into single flakes of clay.

The binder composition preferably comprises air micro bubbles bonded to a considerable part of the clay flakes.

The binder composition is preferably a liquid based dispersion, preferably based on water.

The binder composition preferably comprises at least one plant nutrient.

The binder composition preferably comprises one or more dispersion agents.

Another feature of the invention relates to a method for the preparation of a binder composition, whereby the method comprises the steps of homogenising a dispersion of clay and a liquid in a homogenisation device in order to make a dispersion of clay flakes and to introduce a clay flake dispersion and to introduce gas micro bubbles in the dispersion of clay flakes.

The gas micro bubbles are preferably added during the dispersion process. The gas is micro bubbles are preferably air micro bubbles.

The dispersion of the clay flakes is preferably put into a substantially laminar flow, for thereafter to be put into a turbulent flow caused by a substantial change of direction.

Alternatively, the clay flakes are put into a substantially laminar flow movement, thereafter they are put into a turbulent flow movement caused by a substantial change of direction, whereafter the flakes again are put into a substantially laminar flow for thereafter again to be put into a turbulent flow caused by a substantial change of direction.

The change of direction is preferably in the range 45-135 degrees.

The method according to the invention preferably also comprises the step of introducing at least one dispersant to the dispersion of clay flakes.

The method further comprises the preferable step of adding at least one plant nutrient to the dispersion of the clay flakes.

A further embodiment of the present invention relates to the use of a clay flake dispersion according to the invention as a water- and particle binding agent and a capillary transport enhancing agent for a soil mass as well as a plant protection agent.

The treated layer of sand particles have the ability to filter out unwanted positively charged impurities, for example salt in seawater, cleaning contaminated water.

The filter mass will typically consist of a particle structure which is pretreated with the clay flake dispersion in such a way that the particles are covered with clay flakes as done for stopping wind erosion in sandy deserts. This method uses approximately 13% of the amount of clay used in the old dry mixing method and achieves the same benefits together with an immediate binding of the sand particles.

The process for the preparation of the binder composition according to the invention may be carried out in any suitable device.

The present invention also relates to the use of the above binder composition as a filtering mass.

In this embodiment of the invention the binder composition is used to increase the adsorption- and absorption ability of for instance water, impurities in water and unwanted substances in or on a target object when the binder composition is brought into contact with the target object.

When the binder composition is used to remove unwanted substances from a target object this is done by filtration of a fluid containing the unwanted substances through the binder composition which is prepared with the wanted structure in such a way that the unwanted substances are retained in the binder composition.

A preferred embodiment of this aspect of the invention relates to use of the clay flake dispersion as disclosed above for the preparation of a filter mass for purification of water and air, including desalination of sea water. The filter mass may typically consist of a particle structure which is pretreated with the clay flake dispersion in such a way that the particles are covered by clay flakes.

In practise the desalination of sea water may be carried out of preparing a layer of sand on a mesh, this is treated with the clay dispersion and when the layer is filled with salt remains, this can be flushed into the ocean or the salt can be used for other purposes.

Below a non-limiting example of a preferred embodiment will be described, which is shown in the enclosed figures, wherein FIG. 1 shows an example of a non-swelling clay particle composed of a plurality of flakes;

Figure 1:
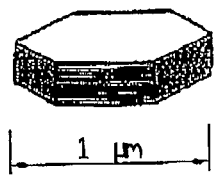

FIG. 1 shows an example of a clay particle of a non-swelling clay type. The transverse dimension is about 1 µm. A particle may contain up to 1200 flakes. Examples of non-swelling clays are kaolin and illite.

Figure 2:
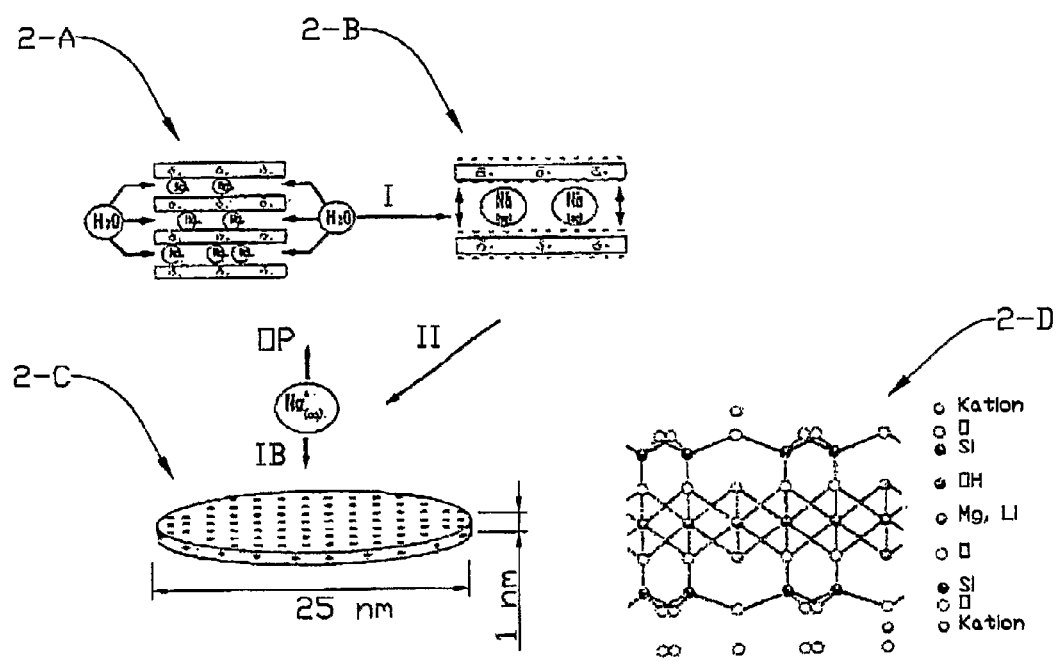
FIG. 2 shows the basic particle- and crystal structure in synthetic laponite clay.

In FIG. 2 the numeral 2-A shows a part of a particle stack of a swelling synthetic clay of laponite type before hydratisation. A hydratisation process I results in the swelling of the clay particle stack, shown in magnification in 2-B. A separation II of the hydrated clay particle stack 2-B provides individual clay flakes 2-C, here shown in increased magnification. The metal ion bonding to the surface of the clay flake is illustrated by the sodium ion Na(+), whereas the osmotic pressure leads to a weakening of the metal ion bonding. A magnified section 2-D schematically shows the molecular structure in the clay particle and at its surfaces.

Laponite is an example of a triochtahedral smectite.

Non-swelling clay can not be separated be hydratisation solely. When the clay particles are exposed to considerable mechanical stress, for instance considerable shear forces by turbulent flow in accordance with the inventive method for homogenisation of a clay flake dispersion, or by using a suitable homogenisation device, a stack of non-swelling clay flakes may be separated. It is obvious that also swelling clay flakes may be separated in this manner.

Figure 3:
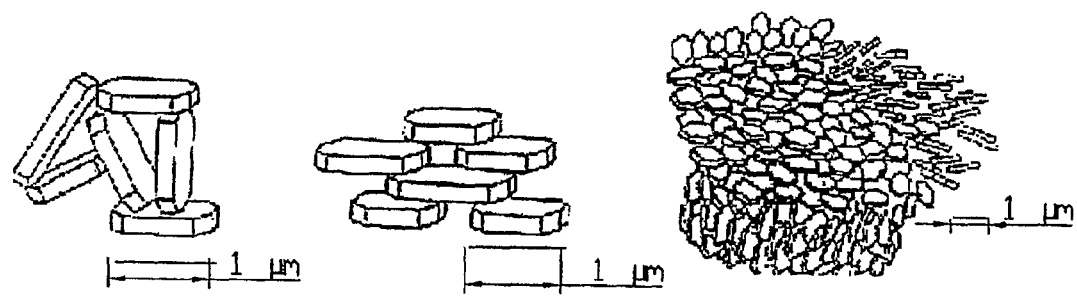
FIG. 3 shows aggregates of non-swelling flakes of clay which are mixed in water.

FIG. 3 shows typical clay flake structures when a non-swelling clay is mixed with water. The water is not capable of penetrating in between the single flakes and the stacks will remain intact. Different structures may be formed by the single flakes of non-swelling type when these are mixed with water.

Figure 4:
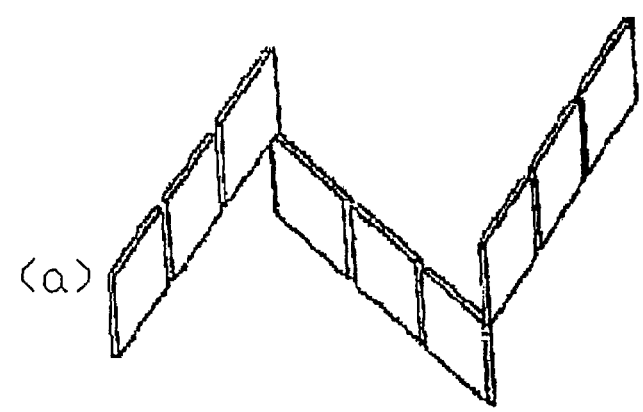
FIG. 4 shows typical flake structures when swelling flakes of clay are dissolved in water.
Figure 4:
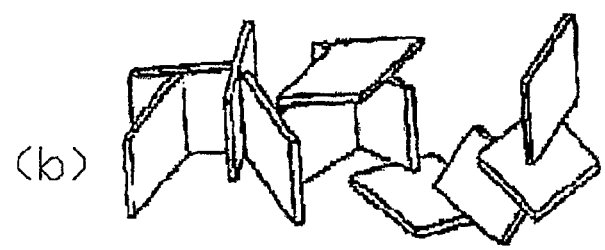
Figure 4:
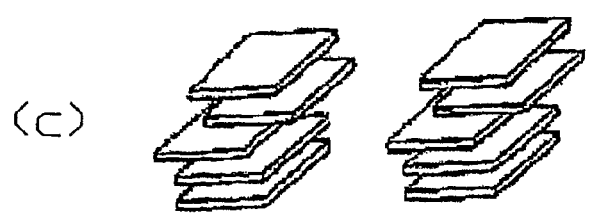

FIG. 4 shows different clay flake structures which are formed when clay flakes are dispersed in water. The structures are surrounded by a cloud of ions. Typical flake structures formed by swelling clay are: (a) edge against edge (chain structure), (b) surface against edge (house of cards) and (c) surface against surface (as a deck of cards).

Figure 5:
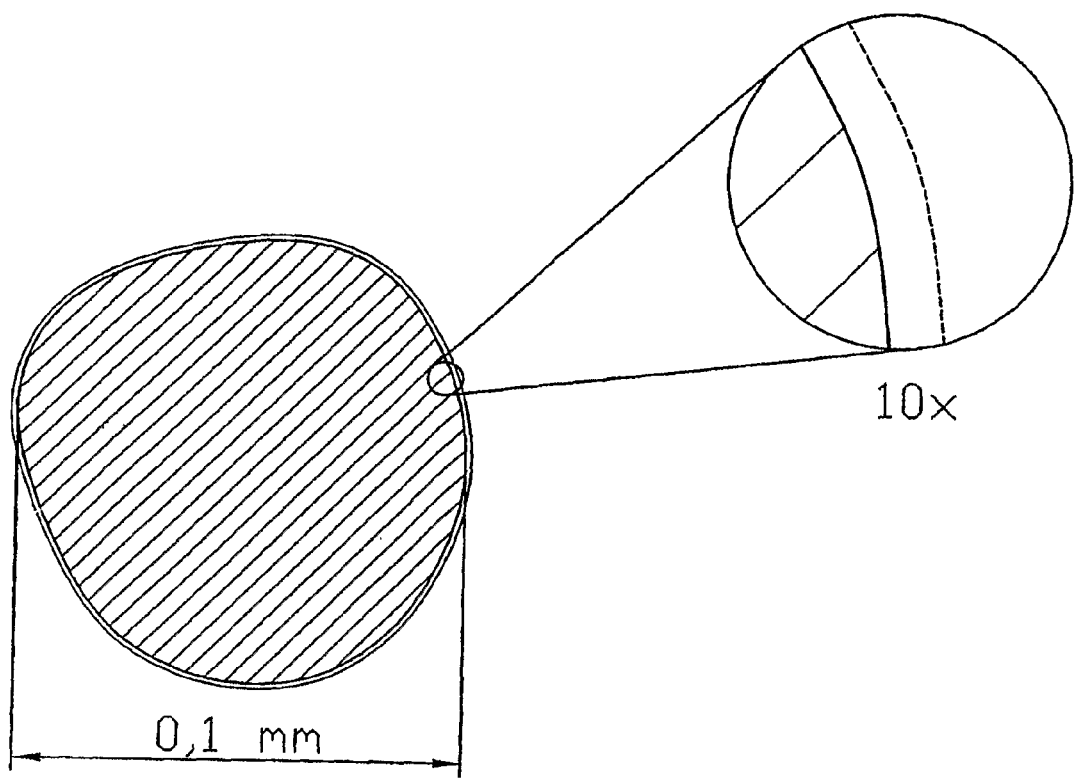
FIG. 5 shows a section through a single grain of sand covered by single flakes of clay according to the invention.

FIG. 5 shows a section through a single grain of sand surrounded, according to the invention, by single flakes of clay with a thickness of 1 nm and a transverse dimension of 25-400 nm. When the grain of sand has a diameter of 0.1 mm between 1000 and 13000 flakes are required to cover the circumference with flakes of clay of the given magnitude. In order to cover the whole surface of the grain of sand about 50.000.000 flakes of a transverse dimension of 25 nm, about 3.000.000 flakes with a transverse dimension of 100 nm and about 200.000 flakes with a transverse dimension of 400 nm are needed.

A binder composition according to the invention is provided by treating a dispersion of clay and water in a mechanical homogenisation device with a very high turbulence index, for example the one described above, for thereby to split the normally smallest components of the clay into single flakes. In order to keep the mixture stable air is also supplied to the dispersion, so that micro bubbles of air bind to the single flakes of clay, and neutralise the negative polarity of the clay flakes. The air bubbles increase the stability of the mixture and thereby prevent sedimentation. Sedimentation may also be prevented when the dispersion after homogenisation is kept in motion with the aid of for instance a rotation device.

Said micro bubbles have a diameter of from about 1 nm to about 20 µm.

In an alternative embodiment of the binder composition one or more additives are added, for example plant nutrients, in dispersion or solution. Added in dispersion form, the particle diameter must be less than 20 µm in order for the substance to be able to be watered down in the sand together with the rest of the mixture.

In a further embodiment of the binder composition a dispersion agent is added in order to keep the binder composition homogeneous for a sufficient time. Without any salt present, the air bubbles stabilize the mixture for 2-4 days.

Application of the binder composition on the particle mass to be treated may for instance be accomplished by spraying, flooding or by sinking in the particle mass. The particle mass may be sand, gravel, humus, aggregates for the production of building materials, for example raw materials for the production of bricks, etc.

The amount of binder composition used is adjusted according to the particle mass to be treated. In order to improve the properties of sand a few grams of the binder composition (based on dry matter) is used per kilogram of sand.

Below the invention will be illustrated further by the following non-limiting examples.

EXAMPLES

Two types of experiments have been carried out.

The first one were pot experiments aimed at comparing the effect of different levels of both suspended kaolin and dry mixing kaolin on wheat grain germination percent and physical properties, the second one was wind tunnel experiments aimed at studying the effect of suspended kaolin on threshold velocity and soil loss by wind erosion.

Germination Experiments

This experiment was carried out under greenhouse conditions in order to compare the effect of different levels of kaolin either in suspended form or as a powder, i.e. dry mixing with soil, on the germination rate of wheat grains.

The experimental treatments included the following:
control, i.e. without kaolin application,
two levels of kaolin, i.e. 2.5% (of soil mass to root depth—7 kg=175 gram clay) (T1) and 5% (of soil mass to root depth—7 kg=350 gram clay) (T2) applied as dry mixing.
four levels of kaolin, i.e. 1% (of suspension weight—0.9 kg=9 gram) (T3), 1.5% (of suspension weight—0.9 kg=13.5 gram) (T4), 2% (of suspension weight—0.9 kg=18 gram) (T5) and 2.5% (of suspension weight—0.9 kg=22.5 gram) (T6) applied as suspended kaolin. The suspension applied to field capacity=900 ml.

The pots were arranged according to completely randomised design, and each treatment was replicated three times. The total number of pots was 7·3=21 pots.

Experimental Procedure

After application of the above mentioned treatments, 20 grains of the local wheat variety (Triticum vulgari var Sakha 93) which is recommended for desert areas—were sown in each pot. The pots were irrigated up to the field capacity level. The amount of the applied water was 900 ml. Thereafter they were watered with amounts sufficient to compensate the depleted moisture. Such amounts ranged between 100 to 150 ml. Germination began after 4 to 6 days at which the rate of germination was followed up and recorded.

After 20 days from sowing the vegetative parts of the plants were harvested and dried in a ventilated oven at 70° C., thereafter the dry weight was recorded.

Soil penetration resistance for each of the applied treatments was measured by using a computerised electrical Penetrometer after harvesting.

These tests were conducted in relatively small pots and the studied soil is mainly sand. Penetrometer readings were taken at every 3 cm intervals. Because the penetration resistance is strongly affected by soil moisture content, soil samples were taken at each tested depth to determine the soil moisture content at the time of measurements. Thereafter the soil samples were collected from each pot to determine soil aggregates, field capacity, and wilting percentage.

Experimental Results:

The given percentages in all the report give percent value which seems to be % of the same objects, but as shown in brackets is of different objects: 5% (of total soil weight 7 kg=350 gram clay) dry kaolin and/or 5% (of the applied water suspension 0.9 kg=45 gram clay) suspended kaolin. The amount of clay used in the suspension is 13% of the amount used in the dry mixing, the old method. The suspended clay bind the particles as soon as applied and the dry mixing, old method must have water applied before it had any binding abilities, dry clay particles is dangerous for humans when inhaled into the lungs. The remarkable result is thus that this method uses approximately 13% of the amount of clay used in the old dry mixing method and achieves the same benefits together with an immediate binding of the sand particles.

Germination Rate and Seedlings Dry Weight:

Table (1) shows that the application of kaolin either by mixing dry or suspended kaolin with any level increased germination percent after four days from sowing as compared to the control treatment. After six days from sowing the same trend was obtained with the exception of applying suspended kaolin with 1% level. The best levels were 2.5% for dry mixing and 1.5% suspended clay, respectively.

From the statistical point of view the difference between germination rates under 2.5% of dry application and those under 1.5% of suspended kaolin treatments were not significant.

TABLE 1

The effect of different levels and methods of kaolin application on wheat grain germination

| Method of application | Level of application | After 4 days | | After 6 days | |
|---|---|---|---|---|---|
| | | No. of germinated grains | Germination % | No of germinated grains | Germination % |
| Control (without application) | — | 8 | 40 | 17 | 85 |
| | — | 11 | 55 | 20 | 100 |
| | — | 7 | 35 | 17 | 85 |
| | mean | 8.7 | 43.5 | 18 | 90 |
| Dry mixing kaolin (% of soil mass to root dept) | 2.50% | 15 | 75 | 20 | 100 |
| | | 18 | 90 | 20 | 100 |
| | | 16 | 80 | 20 | 100 |
| | mean | 16.33 | 81.7 | 20 | 100 |
| | 5% | 14 | 70 | 20 | 100 |
| | | 13 | 65 | 19 | 95 |
| | | 12 | 60 | 19 | 95 |
| | mean | 13 | 65 | 19.3 | 96.7 |
| Suspended Kaolin (of suspension weight) | 1% | 9 | 45 | 17 | 85 |
| | | 10 | 50 | 18 | 90 |
| | | 10 | 50 | 16 | 80 |
| | mean | 9.7 | 48.3 | 17 | 85 |
| | 1.50% | 15 | 75 | 20 | 100 |
| | | 15 | 75 | 20 | 100 |
| | | 15 | 75 | 20 | 100 |
| | mean | 15 | 75 | 20 | 100 |
| | 2% | 16 | 80 | 19 | 95 |
| | | 17 | 85 | 19 | 95 |
| | | 13 | 65 | 18 | 90 |
| | Mean | 15.3 | 76.7 | 18.7 | 93.3 |
| | 2.5 | 13 | 65 | 20 | 100 |

The values are the means of three replicates

Concerning the dry weight of wheat seedlings, Table (2) shows that the values associated with any level of kaolin either dry mixing kaolin or suspended kaolin were lower than that of the control treatment. The statistical analysis proved that these differences were not significant.

TABLE 2

The effect of different levels and methods of kaolin application on dry weight of wheat seedlings

| Method of Application level | Dry Mixing Kaolin | Suspended Kaolin |
| --- | --- | --- |
| Control treat. | 0.99 | — |
|  | 0.82 | — |
|  | 0.94 | — |
| Mean | 0.92 | — |
| 1% | — | 1.01 |
|  | — | 0.69 |
|  | — | 0.8 |
| Mean | — | 0.83 |
| 1.50% | — | 0.44 |
|  | — | 0.37 |
|  | — | 0.78 |
| mean | — | 0.53 |
| 2% | — | 0.71 |
|  | — | 0.66 |
|  | — | 0.86 |
| mean | — | 0.74 |
| 2.50% | 0.63 | 0.78 |
|  | 0.43 | 0.89 |
|  | 0.82 | 0.88 |
| mean | 0.62 | 0.82 |
| 5% | 0.74 | — |
|  | 0.77 | — |
|  | 0.92 | — |
| mean | 0.81 | — |

Penetration Resistance:

As mentioned above, the penetration resistance is strongly dependent on the amount of moisture retained in the soil (i.e. layer under test). Therefore, the amount of soil moisture was measured in soil samples taken very close to the penetrometer cone at the time of measuring soil resistance. The obtained data of soil moisture in the tested depths (0-5, 5-10 and 10-15 cm) is given in table (3). This table shows that the soil moisture content at the time of measurement was almost similar either in respect to the applied treatments or in the tested depth in each pot. Therefore, the obtained variations in soil resistance expressed by the penetration resistance data are mainly related to the influence of the kaolin treatments, i.e. the levels and methods of application. In other words, under the conditions of the current study, the variation in soil resistance can be explained only on the basis of the kaolin treatments because the influence of soil moisture on resistance is negligible, as shown in table (3)

TABLE 3

Soil moisture content (w/w) at time of Penetration resistance measurement under the conditions of applied treatments

| Depth of measurements Kaolin treatment | at 0-5 cm | at 5-10 cm | at 10-15 cm | Average of soil moisture(%) |
| --- | --- | --- | --- | --- |
| Control | 0.45 | 0.12 | 0.12 | 0.23 |
| Dry Mixing Kaolin 2.5% (% of soil mass to root dept) (T1) | 0.22 | 0.14 | 0.24 | 0.2 |
| Dry Mixing Kaolin 5% (% of soil mass to root dept) (T2) | 0.23 | 0.44 | 0.27 | 0.31 |
| Suspended Kaolin 1% (of suspension weight) (T3) | 0.26 | 0.44 | 0.26 | 0.32 |
| Suspended Kaolin 1.5% (of suspension weight) (T4) | 0.16 | 0.24 | 0.12 | 0.17 |
| Suspended Kaolin 2% (of suspension weight) (T5) | 0.18 | 0.24 | 0.16 | 0.19 |
| Suspended Kaolin 2.5% (of suspension weight) (T6) | 0.13 | 0.18 | 0.19 | 0.16 |

Regarding the influence of the application level it has been shown that the penetration resistance is linearly associated with the application level. In other words, mixing dune sand with kaolin at a rate of 5% dry or 2% suspended kaolin (w/w) has resulted in increasing the penetration resistance from about 0.4 to 1.40 Mpa/cm$^2$. This remarkable impact is favourable for both plant production as well as environmental requirements. These low values of soil strength do not impede root growth of most of the cultivated crops while improving the soil bearing capacity and thus trafficability.

Wind Tunnel Experiments

These experiments focus on the study of the relation between wind velocity and soil loss or threshold velocity, i.e. the velocity required to create soil particle movement, under different levels of binder, i.e. kaolin, suspension.

The capacity of the binder according to the present invention to reduce the soil loss by wind was measured in wind tunnel experiments. The experiments were carried out at the "Cold and Arid Regions Environmental and Engineering Research Institute, The Chine Academy of Sciences" in China. The tunnel was an open-circuit type through which air was forced by a blower to the test section with dimensions of 1.0 m width, 0.6 m height and 16.23 m length. Air was sucked from ambient through a bell shaped entrance by the blower to the entrance section and then proceeded to the exit. Before reaching the test section, the flow passed through a diffusor followed by a convergent nozzle and wind simulator component.

The test section was equipped with traverse mechanism to measure the flow velocity profile at different levels. The diffusor floor was equipped with a sand trap mechanism in order to collect sand transported and the air left through a vertical duct to the outside air.

The following table shows the test results obtained.

It is evident that at any wind velocity the soil loss decreased by increasing application levels, but the percent reduction varied according to the wind velocity. The highest reduction occurred with 5% suspension and 3 L/m2 or more and 10% suspension and 1 L/m2 or more, at wind velocity of 27.5 m/s with 100% reduction. It is also evident that the threshold velocity increased by increasing the binder suspension.

Tests performed in the windtunnel belonging to:
COLD AND ARID REGIONS ENVIRONMENTAL AND ENGINEERING RESEARCH INSTITUTE, THE CHINESE ACADEMY OF SCIENCES
China 26.-27.10.2006:

without pre-watering of the ground, the increased soil moisture in the soil surface layer (i.e. 0-10 cm) increased by 24%. Screening experiments have indicated that this increase seems to be exponentiental.

It will be obvious for a person skilled in the art that the electrostatically binding properties of the binder composition is of use in all areas where it is desirable to fix small entities, for example microscopic particles, atoms, viruses, bacteria and other cellular structures, to a medium, in order to remove unwanted substances or add wanted substances to change the properties of the medium, as described above and as claimed in the following patent claims.

Windtunnel tests of the effect of DESERT CONTROL INSTITUTE Inc's clay suspension

| Tray no. | Tray + sand | Sand | Added Suspension | L/M2 | Added suspension gr + type | Control weight Susp + tray + sand | gr After drying | gr after wind-tunnel test | gram Sand loss | % Loss | % reduction of Loss | At wind velocity m/s |
|---|---|---|---|---|---|---|---|---|---|---|---|---|
| | | | 10% | Type A | Type A | | | | | | | |
| 1 | 2808 | 2578 | 59 | 1 | 59 | 3090 | NA | | | | | 27.5 |
| 1, 2 | 3128 | 2898 | 52 | 1 | 52 | 3182 | 3126 | 3122 | 4 | 0.14 | 100 | 27.5 |
| 2 | 3059 | 2829 | 155 | 3 | 155 | 3208 | 3063 | 3061 | 2 | 0.07 | 100 | 27.5 |
| 3 | 3059 | 2829 | 264 | 5 | 264 | 3415 | 3170 | 3170 | 0 | 0.00 | 100 | 27.5 |
| 4 | 3053 | 2823 | 432 | 10 | 432 | 3470 | 3071 | 3071 | 0 | 0.00 | 100 | 27.5 |
| | | | 5% | Type B | Type B | | | | | | | |
| 5 | 2980 | 2750 | 51 | 1 | 51 | 3026 | 2980 | 912 | 2068 | 75.20 | 25 | 27.5 |
| 6 | 3077 | 2847 | 156 | 3 | 156 | 3228 | 3080 | 3077 | 3 | 0.11 | 100 | 27.5 |
| 7 | 3067 | 2837 | 264 | 5 | 264 | 3314 | 3074 | 3072 | 2 | 0.07 | 100 | 27.5 |
| 8 | 3006 | 2776 | 507 | 10 | 507 | 3495 | 3015 | 3012 | 3 | 0.11 | 100 | 27.5 |
| 9 | 2966 | 2736 | 193 | 10 | 193 | 3151 | NA | | | | | 27.5 |
| 10 | 3174 | 2944 | 55 | 1 | 55 | 3179 | 3179 | 3104 | 75 | 2.55 | 97 | 27.5 |
| 11 | 3170 | 2940 | 151 | 3 | 151 | 3183 | 3183 | 3183 | 0 | 0.00 | 100 | 27.5 |
| 12 | 3074 | 2844 | 193 | 5 | 193 | 3087 | 3087 | 3087 | 0 | 0.00 | 100 | 27.5 |
| | | | 10% | Type A | Type A | | | | | | | |
| 13 | 3084 | 2854 | 50 | 1 | 50 | | 3079 | 3071 | 8 | 0.28 | 100 | 27.5 |
| 14 | 3102 | 2872 | 162 | 3 | 162 | | 3106 | 3105 | 1 | 0.03 | 100 | 27.5 |
| 15 | 3170 | 2940 | 252 | 5 | 252 | | 3181 | 3181 | 0 | 0.00 | 100 | 27.5 |

Tray weight 230 Gr

NA = Fault in tray Not tested because of fault in the tray

Results

The results show that increasing kaolin levels increased threshold velocity, in other words the velocity required to create soil particle movement increased by adding suspended kaolin at any level. As mentioned the threshold velocity is the lowest wind velocity which create movement of the soil particles.

It is also evident that at any wind velocity soil loss decreased by increasing application of kaolin levels, but the percent reduction varied according to the value of wind velocity. The highest reduction occurred with 5% suspension and 3 L/m2 or more and 10% suspension and 1 L/m2 or more, at wind velocity of 27.5 m/s with 100% reduction.

It is evident from the above experiments that the present invention allows the use of clay of moderate quality and at the same time gives improved results and just using an average of 13% of what was used in the old method of dry mixing. Or as said above to stop wind erosion efficiently by 1 L water/m2 using 100 gram clay per litre has never been done before.

The obtained results also indicate that the applied treatments significantly increase the adhesion and cohesion forces within the soil matrix, with consequent decrease in soil erodibility and hence erosion losses.

The most recent results obtained by applying 0.5-1 litre suspension per m2 with a percolation depth of 0.5-1 cm have demonstrated that by the application of 9% suspended kaolin, It should be understood from the foregoing description that various modifications and changes may be made in the preferred embodiments of the previous invention without departing from its true spirit. It is intended that the foregoing description is for purposes of illustration only and should not be construed in a limiting sense.

The invention claimed is:

1. A binder composition which displays static electric charge, for use as a texture stabilising element in masses of organic and/or inorganic particles, said binder consisting of a liquid and clay, homogenized using air only, wherein the clay particles are present substantially as separated, single flakes of clay.

2. The binder composition according to claim 1, wherein said liquid is water.

3. The binder composition according to claim 1, further comprising air micro bubbles bonded to a substantial part of the clay flakes.

4. The binder composition according to claim 1, wherein the clay is expanded or non-expanded clay.

5. The binder according to claim 1, wherein the clay is non-expanded clay.

* * * * *